United States Patent [19]
Collins

[11] Patent Number: 5,904,354
[45] Date of Patent: May 18, 1999

[54] MECHANICALLY ENERGIZED ELEMENT

[75] Inventor: Leo G. Collins, Lewisville, Tex.

[73] Assignee: Halliburton Energy Services, Inc., Dallas, Tex.

[21] Appl. No.: 08/982,327

[22] Filed: Dec. 2, 1997

Related U.S. Application Data

[63] Continuation of application No. 08/713,381, Sep. 13, 1996, abandoned.

[51] Int. Cl.$^6$ ........................................................ F16J 15/00
[52] U.S. Cl. ......................... 277/328; 277/337; 277/510; 277/540; 166/187
[58] Field of Search .................................... 166/187, 203; 277/322, 329, 328, 337, 510, 534, 540

[56] References Cited

U.S. PATENT DOCUMENTS

| | | |
|---|---|---|
| Re. 7,244 | 7/1876 | Martin . |
| 218,282 | 8/1879 | LaFoy et al. . |
| 2,196,668 | 4/1940 | Ragan ........................................ 166/12 |
| 2,216,268 | 10/1940 | Fritsche ..................................... 166/1 |
| 2,390,372 | 12/1945 | Johnston et al. .......................... 166/10 |
| 2,738,015 | 3/1956 | Lynes ....................................... 166/185 |
| 3,784,214 | 1/1974 | Tamplen .................................. 277/116.8 |
| 4,161,319 | 7/1979 | Stocking ................................. 277/116.6 |
| 4,379,558 | 4/1983 | Pippert .................................... 277/188 |
| 5,150,881 | 9/1992 | McKavanagh ........................... 251/174 |

*Primary Examiner*—Daniel G. DePumpo
*Attorney, Agent, or Firm*—Paul I. Herman

[57] ABSTRACT

The inventive sealing assembly designed to be set by longitudinal compression is mechanically energized, and comprises an elastomeric sealing element and a flexible member in intimate contact with the sealing element, a flexible portion of the flexible member having an expanded and a retracted position, wherein the flexible member is able to forcibly expand the sealing element when the flexible portion of the flexible member is expanded, and further wherein the flexible member is able to forcibly retract the sealing element when the flexible portion of the flexible member is retracted.

The flexible member preferably has a generally cylindrical shape and a plurality of longitudinal slots, and passes at least partially through the sealing element, such that the element covers both the outer and inner surface of the flexible member, as well as passing through the slots. The flexible section of the flexible member should also preferably have at least one outward axially bulging section which is in intimate contact with the sealing element, so that when the flexible member is compressed between the end surfaces, the bulging section flexes radially outwards.

The sealing element should preferably comprise a single unified piece of elastomer. The element can use garter springs or backup plates to help insure that it sets properly. The element can also be made up of fused portions of elastomers having different durometers.

A well tool and method which utilize the inventive device are also disclosed.

14 Claims, 6 Drawing Sheets

MECHANICALLY ENERGIZED ELEMENT

This application is being filed as a continuation application of U.S. patent application Ser. No. 08/713,381, filed Sep. 13, 1996 now abandoned.

BACKGROUND OF THE INVENTION

Elastomeric sealing assemblies are commonly used in oil and gas well downhole operations, to sealingly isolate a section of a flow bore, either in the tubing, or in the annulus between the tubing and the casing. For example, sealing assemblies are used with such downhole equipment as packers (which seal the annulus) and bridge plugs (which seal the tubing). Sealing assemblies seal by providing a solid ring of elastomer, known as a sealing element, that can extend from the setting tool to the inner wall of the flow bore, the inner wall acting as a setting surface.

Currently there are two main methods by which sealing assemblies are set. The first is by use of a propping sleeve, wherein the sealing element sits on a sleeve of varying diameter. While the tool is being run into the hole, the sealing element sits on a reduced diameter portion of the sleeve, so that the sealing element is retracted and does not interfere with the travel of the tool into the hole. Once the tool is in the proper position in the hole, the sealing assembly is set by forcibly sliding the sealing element onto a larger diameter portion of the sleeve. Expanded, the sealing element contacts the wall of the flow bore, preventing fluids from traveling through that flow bore. When the tool is to be released, the sealing element is moved back onto a smaller diameter portion of the sleeve.

The other method of setting a sealing assembly is by compression. For this method, the sealing assembly is positioned between two hard end surfaces. To set the sealing assembly, the end plates are moved towards each other, longitudinally compressing the sealing element, thereby forcing the element to expand radially outward towards the setting surface. To release the sealing assembly, the plates are moved back apart, and the sealing element hopefully relaxes and returns to an approximation of its original, smaller diameter shape.

Two problems have arisen and are associated with compressive sealing assemblies. First, to insure a complete and strong seal, the sealing element must uniformly and forcefully contact the sealing surface. In some cases, due to the radial outward distance the sealing element has to travel, it may not contact the sealing surface at all, or the entire perimeter of the sealing element may not contact the sealing surface. Also, if the sealing element has to travel a long radial distance to reach the sealing surface, the sealing element can distort and twist, causing an imperfect seal. Further, even if the sealing element reaches the sealing surface, it may not be pushed forcibly against the sealing surface, making it easier for leaks to develop when a sufficient pressure differential is experienced across the sealing element.

The second problem is that after the sealing element has been in its extended and set position for a sufficient length of time, the elastomer begins to permanently distort, such that when the end surfaces are moved back apart, the sealing element will retract little or not at all. The tool then becomes much more difficult to remove from the hole, as the sealing assembly tends to drag on the setting surface as well as hanging up in any reduced diameter portions of the flow bore.

Hence, what is needed is a compressive sealing assembly that can be forcefully and uniformly contacted against the sealing surface to preventing leaks, as well as being able to be forcefully retracted away from the sealing surface, to make removal of the tool easier.

SUMMARY OF THE INVENTION

The inventive sealing assembly designed to be set by longitudinal compression is mechanically energized, and comprises an elastomeric sealing element and a flexible member in intimate contact with the elastomeric sealing element, a flexible section of the flexible member having a radially expanded and a radially retracted position, wherein the flexible member is able to forcibly expand the sealing element when the flexible section of the flexible member is radially expanded, and further wherein the flexible member is able to forcibly retract the sealing element when the flexible section of the flexible member is radially retracted. Forces directed outwardly towards a sealing surface can be generated by the flexible member, applying much greater forces to setting and sealing the sealing element.

The flexible member preferably has a generally cylindrical shape and a plurality of longitudinal slots, and passes at least partially through the sealing element, such that the sealing element covers both the outer and inner surfaces of the flexible member, as well as passing through the slots. The flexible section of the flexible member also preferably have at least one outward axially bulging section which is in intimate contact with the sealing element, so that when the flexible member is compressed between two end surfaces, the bulging section flexes radially outwards.

The sealing element should preferably comprise a single unified piece of elastomer. The sealing element can be made up of fused portions of elastomers having different durometers. The sealing element can use garter springs or backup plates to help insure that it sets properly.

A well tool and method which utilize the inventive device are also disclosed.

DESCRIPTION OF THE PREFERRED EMBODIMENT

Figure 1:
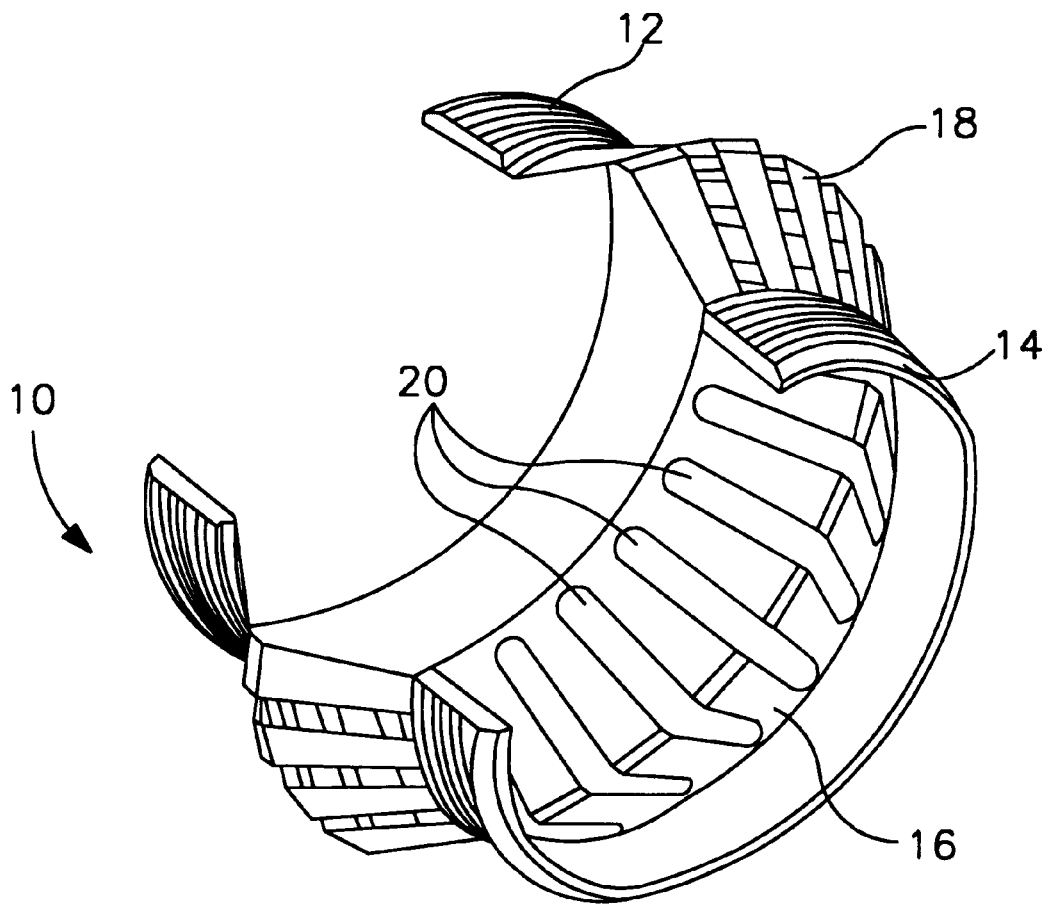
FIG. 1 is a partially cut-away, three-quarter view of a flexible member for use in the inventive concept.

In the description which follows, like parts are marked throughout the specification and drawings with the same reference numerals, respectively. The drawings are not necessarily to scale and the proportions of certain parts have been exaggerated to better illustrate details and features of the invention. In the following description, the terms "upper," "upward," "lower," "below," "downhole" and the like, as used herein, shall mean in relation to the bottom, or furthest extent of, the surrounding wellbore even though the wellbore or portions of it may be deviated or horizontal.

Where components of relatively well known design are employed, their structure and operation will not be described in detail.

Figure 2:
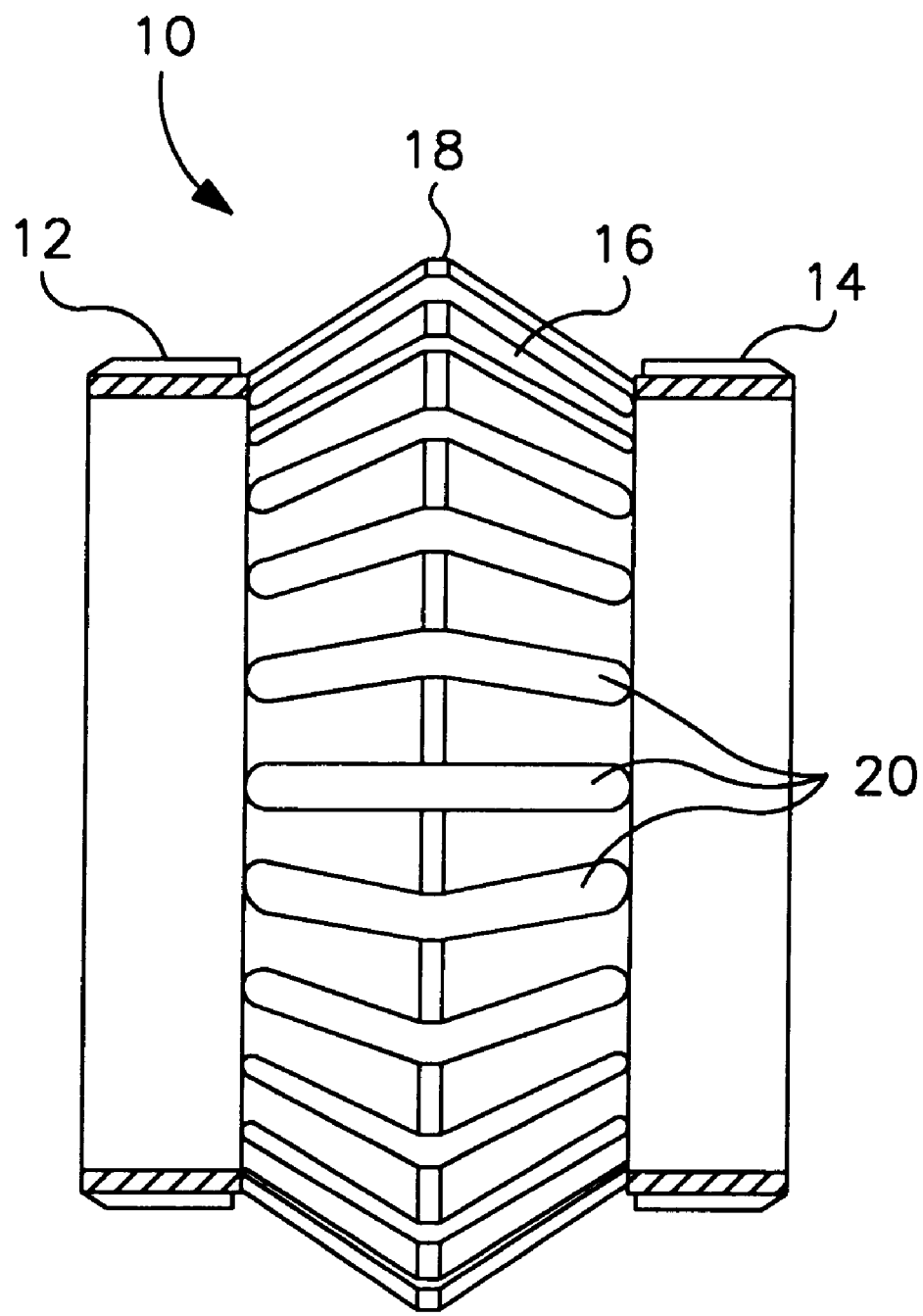
FIG. 2 is a side sectional view of the flexible member of FIG. 1.

Referring now to FIGS. 1 and 2, a flexible member 10 for use in the inventive device is shown. The flexible member comprises a generally cylindrical shape, and would typically be made of metal. The flexible member forms a complete diameter. Both the upper longitudinal end 12 and the lower longitudinal end 14 of the flexible member 10 are threaded for attachment into a tool for which sealing is required, such as a packer (not shown). The flexible member may also be attached by any number of other methods that are well known in the art. The flexible member has a flexible center section 16 which includes a bulging section 18 around its circumference. The flexible member 10 also has a plurality of longitudinally aligned slots 20.

As is readily apparent, if the flexible member 10 is longitudinally compressed, the flexible member will extend uniformly outwardly at its bulging section 18. Likewise, when the flexible member is longitudinally extended, the bulging section will be retracted to a reduced diameter position.

Figure 3:
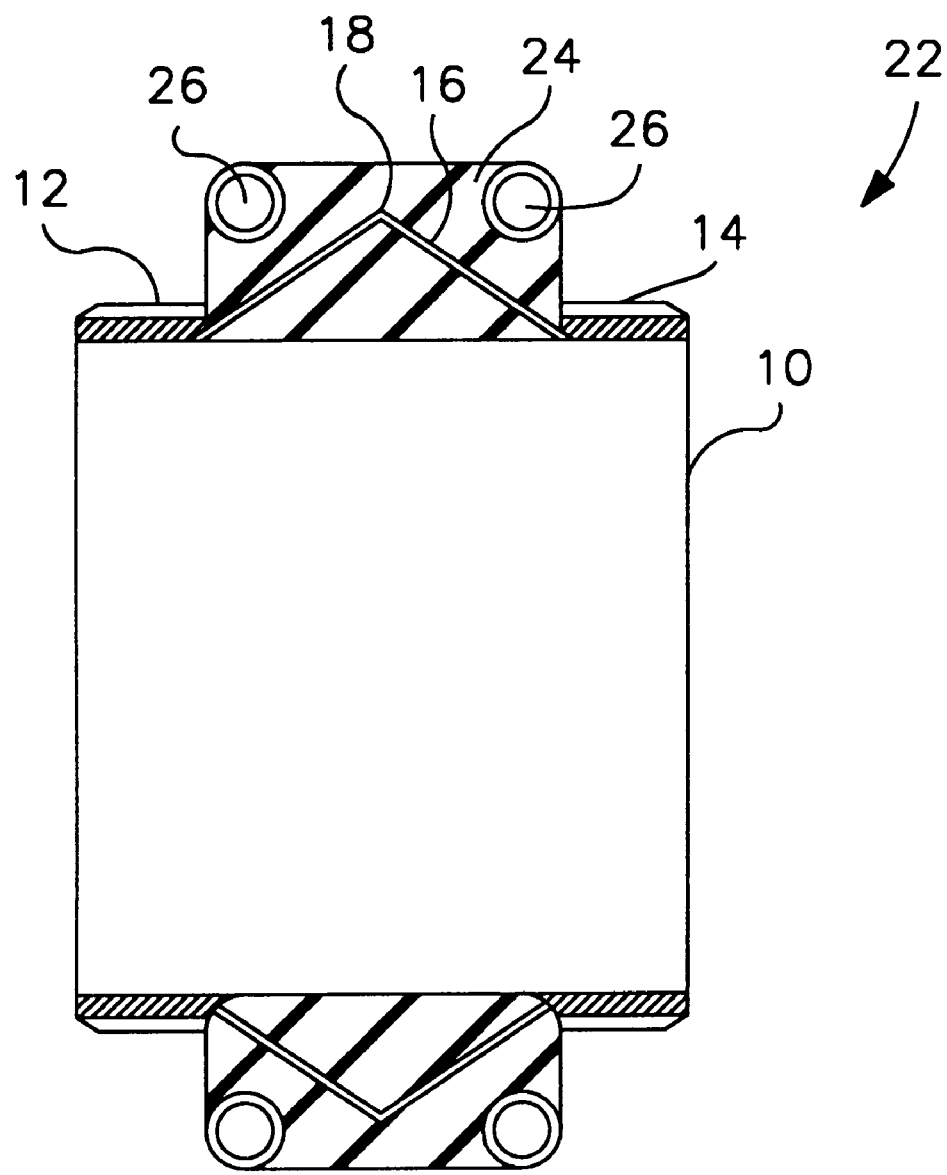
FIG. 3 is a side sectional view of an elastomeric sealing assembly using the inventive concept.

Referring now to FIG. 3, a sealing assembly 22 is shown which includes the flexible member 10 of FIGS. 1 and 2. After the flexible member is manufactured, a single piece elastomeric sealing element 24 is formed onto the flexible center portion 16. The sealing element 24 uniformly circumscribes the flexible member 10, with the sealing element being both internal and external of the flexible center section 16. The sealing element 24 also passes through the slots 20. Once formed on the flexible member, the sealing element is a single, solid piece of elastomer. By being formed this way, the sealing element is in intimate contact with the flexible member, and cannot be easily separated from the flexible member. Further, by being formed in this way, the sealing element is forced to follow the radial movements of the flexible center section. That is, if the bulging section 18 is forced radially outwardly, the sealing element 24 is forced outwardly also, and if the bulging section 18 is retracted, the sealing element 24 is likewise forcibly retracted.

The sealing element 24 can comprise a single type of elastomer, or it can comprise various different elastomers that have been firmly and securely bonded together. For example, the sealing element could be comprised of harder elastomers at the ends, with a softer elastomer in the middle. Such a sealing element would have improved sealing characteristics in the middle portion of the sealing element, while being less likely to distort at its ends. Though not preferable, the sealing element could be two or more separate pieces.

The sealing assembly 22 as shown here also comprises garter springs 26. Garter springs serve to help insure that the sealing element deploys uniformly with little or no distortion or twist, as well as preventing the element from extruding through a large gap. Various support structures, such as beads or rods, may also be added inside the coils of the garter springs to give the garter springs added support, as is well known in the art. The inventive concept can be practiced without garter springs, if desired. Further, the garter springs can be replaced by, or supplemented with, backup shoes.

Figure 4A:
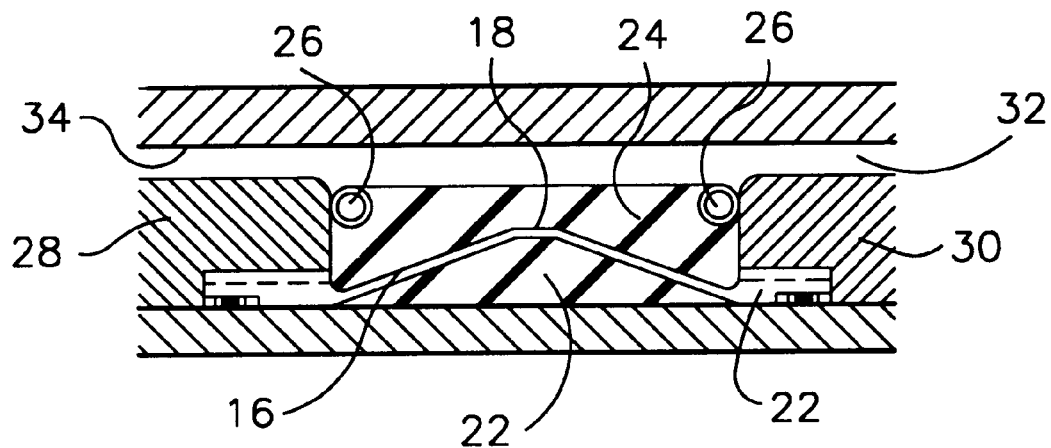
FIG. 4 is a quarter sectional view of the elastomeric sealing assembly of FIG. 3 installed between two setting surfaces and in various states of compression.
Figure 4B:
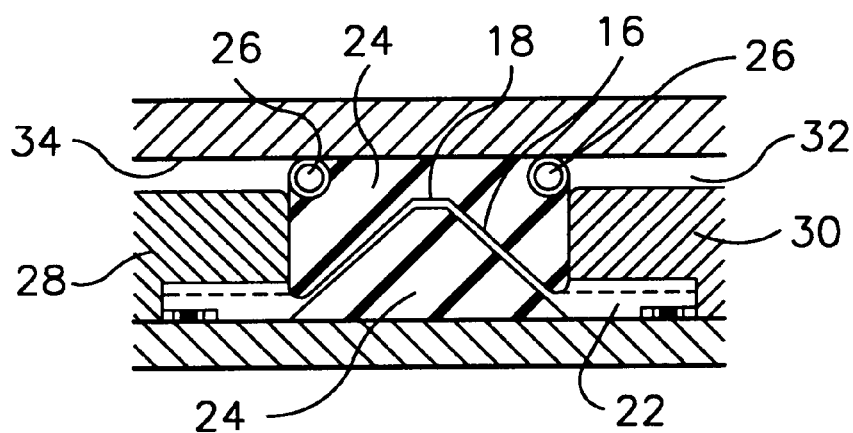

Referring now to FIG. 4A, the inventive sealing assembly 22 is shown in a retracted state, connected into a well tool at threads 12, 14, the well tool having an upper end surface 28 and a lower end surface 30, and positioned within a flow bore 32 having a sealing surface 34. The compressive end surfaces 28, 30, are used to compress both the flexible member 10 and the sealing element 24 of the sealing assembly 22. The inventive device can also be practiced with force being applied only to the flexible member 10. In operation, once the tool is in the desired location in the wellbore 32, the two ends 12, 14, of the flexible member are moved towards each other (i.e., the sealing assembly 22 is longitudinally compressed) by the end surfaces 28, 30. As the sealing assembly 22 is compressed longitudinally, the bulging section 18 expands radially outwardly, carrying the sealing element 24 outward as well, until the sealing element 24 makes contact with the sealing surface 34. This extended position is shown in FIG. 4B. Once the sealing element 24 contacts the sealing surface 34, additional compressive force can be applied to the flexible member 10, which will in turn be converted to outwardly directed force by the bulging section 18, thereby applying additional force to the outer surface of the sealing element, insuring a tight, leak-free seal.

When it is desired to release the tool, the two ends of the sealing assembly 22 are pulled apart (i.e., the sealing assembly is longitudinally extended). Thereby, the bulging section 18 is forcibly retracted, forcibly pulling back the sealing element 24 from the sealing surface 34, to its retracted position.

Figure 5:
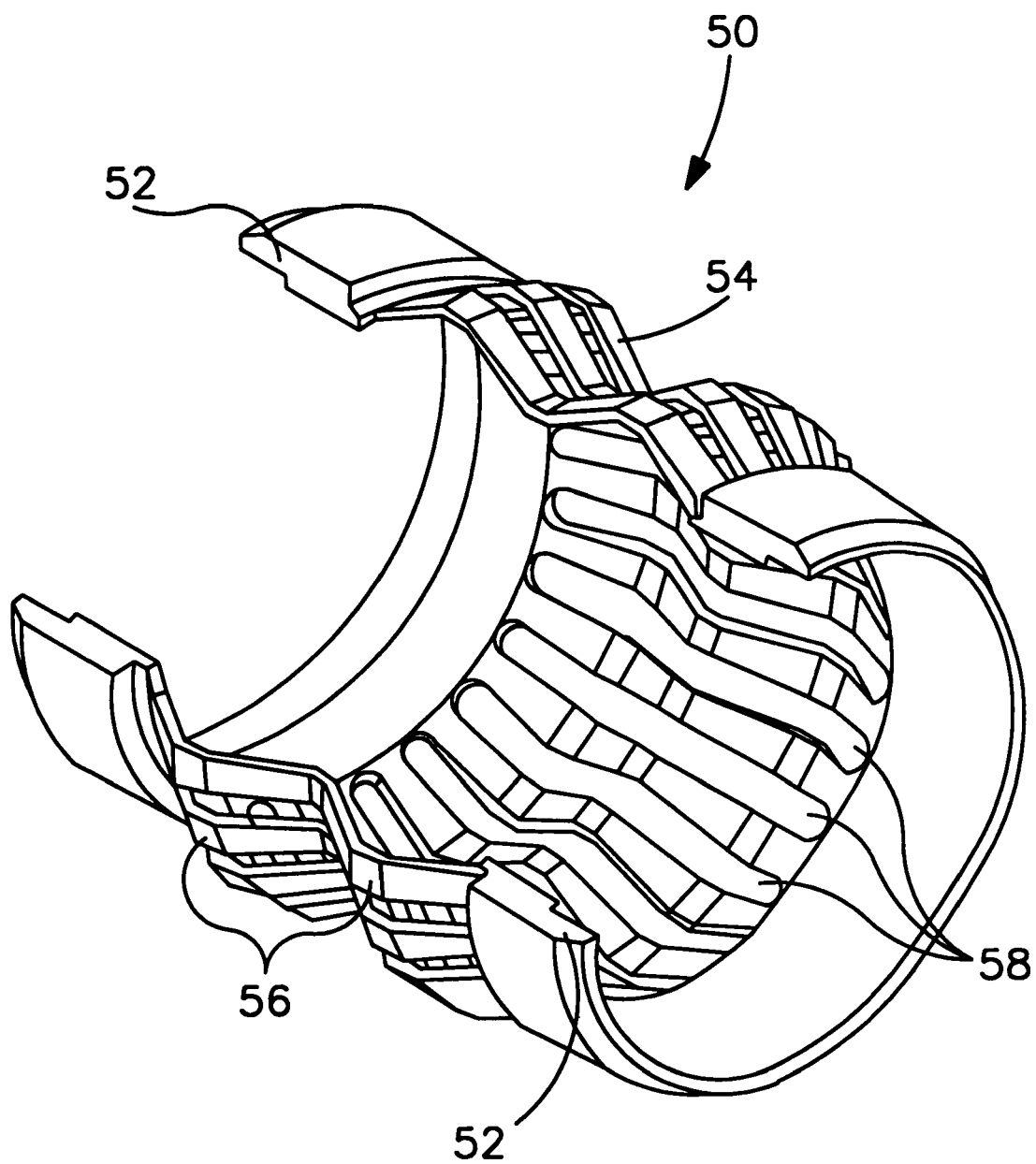
FIG. 5 is a partially cut-away, three-quarter view of a flexible member for use in the inventive concept.

FIG. 5 shows another embodiment of the flexible member of the inventive device. This flexible member 50 differs from that shown in FIG. 1 in that it has compression fittings 52 at either end instead of threads, and its bulging section 56 has two bulges instead of one. The number of bulges is a design choice based on the diameter of the flexible member, as a larger number of bulges will be preferable on some diameter flexible members. This flexible member 50 also has a plurality of longitudinal slots 58 cut through its flexible center section 54.

Figure 6:
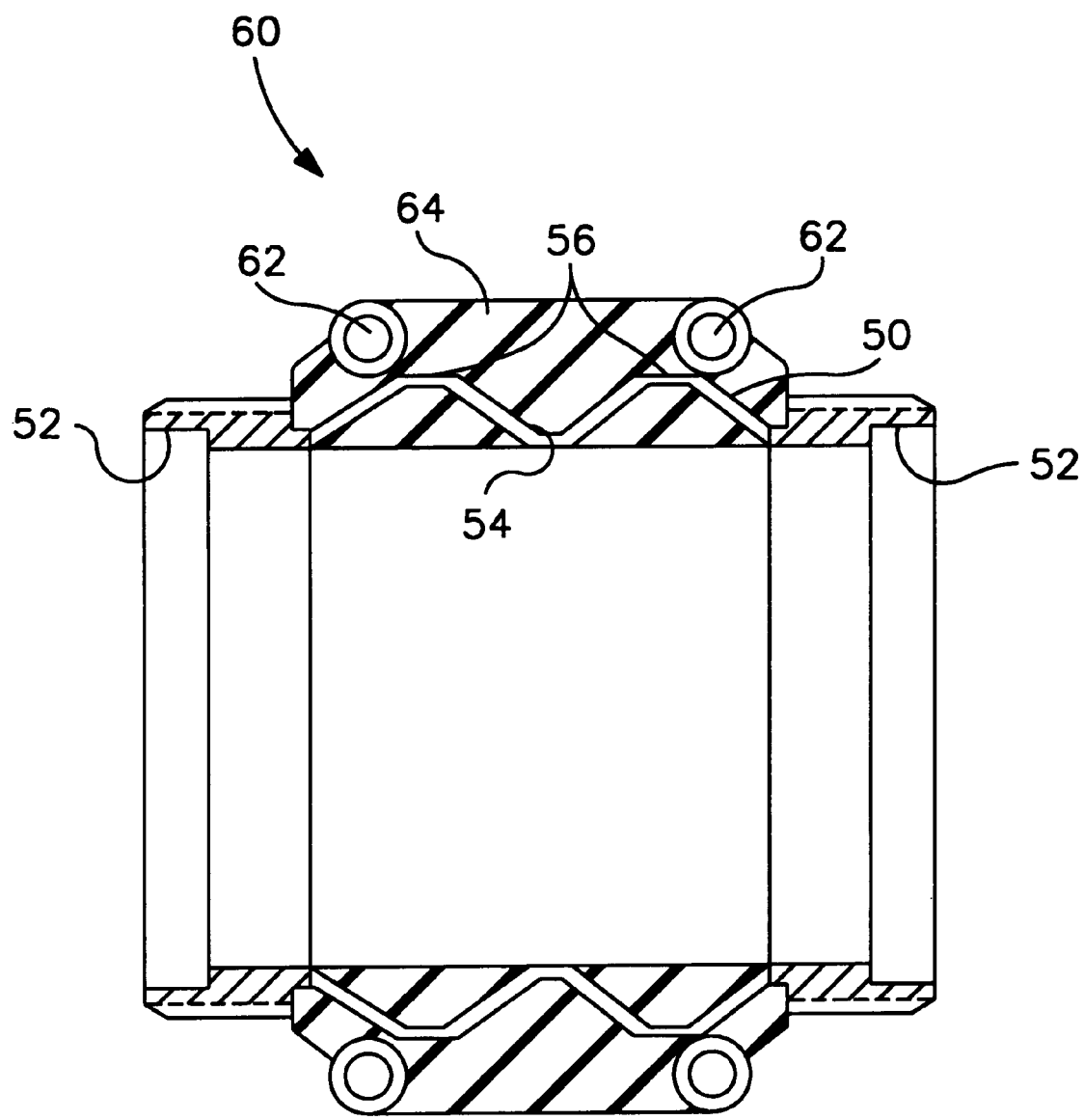
FIG. 6 is a side sectional view of an elastomeric sealing assembly using the inventive concept.

FIG. 6 shows a sealing assembly 60 using the inventive concept, including the two-bulge flexible member 50. Again, the sealing element 64 is formed to completely surround the flexible member center section 54, passing through the slots 58. Thereby, the sealing element 64 will be forcibly expanded when the bulging section 56 is expanded, and the sealing element 64 will be forcibly retracted when the bulging section 56 is retracted. The sealing assembly 60 can also preferably comprise garter springs 62 or backup plates.

The invention as disclosed is able to provide an improved sealing assembly. First, the sealing element can be more forcefully deployed, as the bulging section of the flexible member pushes directly against the sealing element, pushing it squarely and firmly against the sealing surface. Second, no matter how long the sealing assembly has been deployed, the sealing element can be forcibly retracted by the bulging section of the flexible member, allowing for easy removal of the tool.

Thus, the invention is able to meet all the objectives described above. The foregoing description and drawings of the invention are explanatory and illustrative thereof, and various changes in sizes, shapes, materials, and arrangement of parts, as well as certain details of the illustrated construction, may be made within the scope of the appended claims without departing from the true spirit of the invention. Accordingly, while the present invention has been described herein in detail to its preferred embodiment, it is to be understood that this disclosure is only illustrative and exemplary of the present invention and is made merely for the purposes of providing and enabling disclosure of the invention. The foregoing disclosure is neither intended nor to be construed to limit the present invention or otherwise to exclude any such embodiments, adaptations, variations, modifications, and equivalent arrangements, the present invention being limited only by the claims appended hereto and the equivalents thereof.

I claim:

1. A mechanically energized sealing assembly designed to be set by longitudinal compression, comprising:

an elastomeric sealing element; and, a flexible member in intimate contact with the elastomeric sealing element, the flexible member having two ends, a flexible section of the flexible member having a radially expanded position when the two ends are pulled away from each other, and a radially retracted position when the two ends are pushed towards each other, wherein the flexible section of the flexible member forcibly radially expands the sealing element when the flexible section of the flexible member is radially expanded, and further wherein the flexible member forcibly radially retracts the sealing element when the flexible section of the flexible member is radially retracted, the flexible member having an inner surface and an outer surface, the elastomeric sealing element being contacted with both the inner and outer surfaces of the flexible member.

2. The mechanically energized sealing assembly of claim 1, wherein the flexible member has a generally cylindrical shape and passes at least partially through the sealing element.

3. The mechanically energized sealing assembly of claim 2, wherein the flexible member has an inner and outer surface and a plurality of longitudinal slots, wherein a portion of the sealing element passes from the inner surface to the outer surface of the flexible member through the slots.

4. The mechanically energized sealing assembly of claim 2, wherein the flexible section of the flexible member comprises at least one outward axially bulging section which is in intimate contact with the sealing element.

5. The mechanically energized sealing assembly of claim 1, wherein the sealing element is a single unified piece of elastomer.

6. The mechanically energized sealing assembly of claim 5, wherein the sealing element further comprises at least one garter spring.

7. A well tool that can be sealingly set in a flow bore comprising:

a setting mechanism; and, a mechanically energized sealing assembly which can be set and retracted by the setting mechanism, the mechanically energized sealing assembly, comprising:

an elastomeric sealing element; and, a flexible member in intimate contact with the elastomeric sealing element, the flexible member having two ends, the flexible member being operably connected to the setting mechanism by the two ends, a flexible section of the flexible member having a radially expanded position when the two ends are pulled away from each other by the setting mechanism, and a radially retracted position when the two ends are pushed towards each other by the setting mechanism, wherein the flexible member forcibly radially expands the sealing element when the flexible section of the flexible member is radially expanded, and further wherein the flexible member forcibly radially retracts the sealing element when the flexible section of the flexible member is radially retracted, the flexible member having an inner surface and an outer surface, the elastomeric sealing element being contacted with both the inner and outer surfaces of the flexible member.

8. The well tool of claim 7, wherein the flexible member is at least partially contained within the elastomeric sealing element.

9. The well tool of claim 7, wherein the flexible member has a generally cylindrical shape and passes at least partially through the sealing element.

10. The well tool of claim 9, wherein the flexible member has an inner and outer surface and a plurality of longitudinal slots, wherein a portion of the sealing element passes from the inner surface to the outer surface of the flexible member through the slots.

11. The well tool of claim 9, wherein the flexible section of the flexible member comprises at least one outward axially bulging section which is in intimate contact with the sealing element.

12. The well tool of claim 7, wherein the sealing element is a single unified piece of elastomer.

13. The well tool of claim 12, wherein the sealing element further comprises at least one garter spring contained within the sealing element.

14. A method for releasing a longitudinally compressed, mechanically energized, sealing assembly, the assembly comprising a sealing element and a flexible member that is intimately in contact with the flexible member, the flexible member having a generally cylindrical shape, an inner and outer surface and two longitudinal ends, the sealing element being in contact with both the inner and outer surfaces of the flexible member, a portion of the flexible member that is in contact with the sealing element being expanded radially, the method comprising the steps of:

applying a force to one end of the flexible member in one longitudinal direction; and applying a force to the other end of the flexible member in the opposite direction, whereby said flexible member is extended longitudinally, causing the expanded portion of the flexible member to be retracted back to a smaller diameter, thereby pulling the sealing element back to a smaller diameter.

* * * * *